United States Patent
Nielsen et al.

(10) Patent No.: US 9,902,026 B2
(45) Date of Patent: Feb. 27, 2018

(54) COVER, ELECTRONIC DEVICE THEREWITH AND METHOD FOR MANUFACTURING THE SAME

(71) Applicant: HTC Corporation, Taoyuan County (TW)

(72) Inventors: Jens Mitchell Nielsen, San Francisco, CA (US); Christopher Alan Porter, San Francisco, CA (US)

(73) Assignee: HTC Corporation, Taoyuan (TW)

(*) Notice: Subject to any disclaimer, the term of this patent is extended or adjusted under 35 U.S.C. 154(b) by 143 days.

(21) Appl. No.: 14/022,246

(22) Filed: Sep. 10, 2013

(65) Prior Publication Data

US 2015/0070821 A1    Mar. 12, 2015

(51) Int. Cl.
| | | |
|---|---|---|
| H05K 5/03 | (2006.01) | |
| B23P 19/04 | (2006.01) | |
| H04M 1/02 | (2006.01) | |
| A45C 11/00 | (2006.01) | |
| H04M 1/03 | (2006.01) | |

(52) U.S. Cl.
CPC .......... *B23P 19/04* (2013.01); *H04M 1/0283* (2013.01); *A45C 2011/002* (2013.01); *G06F 2200/1633* (2013.01); *H04M 1/03* (2013.01); *Y10T 29/49826* (2015.01); *Y10T 156/10* (2015.01)

(58) Field of Classification Search
CPC ...... H04M 1/0283; H04M 1/03; G06F 1/1613
USPC .................................................. 361/679.01
See application file for complete search history.

(56) References Cited

U.S. PATENT DOCUMENTS

| | | | | |
|---|---|---|---|---|
| 2002/0193136 A1* | 12/2002 | Halkosaari | .......... | H04M 1/0283 455/550.1 |
| 2009/0245564 A1* | 10/2009 | Mittleman et al. | ........... | 381/361 |
| 2010/0008028 A1* | 1/2010 | Richardson | ........... | G06F 1/1626 361/679.01 |
| 2010/0092022 A1* | 4/2010 | Hopkinson | ............ | H04R 1/023 381/391 |
| 2010/0123632 A1* | 5/2010 | Hill | ........................ | H01Q 1/243 343/702 |
| 2011/0186345 A1* | 8/2011 | Pakula | .................. | G06F 1/1626 174/520 |
| 2012/0071217 A1* | 3/2012 | Park | ........................ | A45C 11/00 455/575.8 |
| 2012/0118773 A1* | 5/2012 | Rayner | .................. | G06F 1/1626 206/320 |

(Continued)

FOREIGN PATENT DOCUMENTS

| | | |
|---|---|---|
| TW | M362467 | 8/2009 |
| TW | 201129284 | 8/2011 |
| TW | M433585 | 7/2012 |

OTHER PUBLICATIONS

Office action dated May 12, 2015 for the Taiwan application No. 102142634, filed Nov. 22, 2013, p. 1-9.

*Primary Examiner* — Tuan T Dinh
*Assistant Examiner* — Rockshana Chowdhury
(74) *Attorney, Agent, or Firm* — Winston Hsu

(57) ABSTRACT

A cover adapted to an electronic device is disclosed. The electronic device includes a casing and the cover includes a first covering member and a second covering member. The first covering member is made of first transparent material. The second covering member is adjacent to the first covering member. The second covering member is made of second transparent material, and at least one fine feature is formed on the second covering member.

11 Claims, 9 Drawing Sheets

(56) References Cited

U.S. PATENT DOCUMENTS

| | | | |
|---|---|---|---|
| 2012/0177237 A1* | 7/2012 | Shukla | B29C 45/1671 381/332 |
| 2012/0243151 A1* | 9/2012 | Lynch | H04M 1/0202 361/679.01 |
| 2012/0307183 A1* | 12/2012 | Schultz | G02F 1/133308 349/84 |
| 2012/0320501 A1* | 12/2012 | Ackloo | H04B 1/3888 361/679.01 |
| 2013/0048347 A1* | 2/2013 | Shiu | H05K 1/028 174/254 |
| 2013/0088813 A1* | 4/2013 | Su | G06F 1/1628 361/679.01 |

* cited by examiner

COVER, ELECTRONIC DEVICE THEREWITH AND METHOD FOR MANUFACTURING THE SAME

BACKGROUND OF THE DISCLOSURE

1. Field of the Disclosure

The present disclosure relates to a cover, an electronic device therewith and a method for manufacturing the same, and more particularly, to a cover with scratch resistance, stiffness, transparency and fine features thereon, an electronic device therewith and a method for manufacturing the same.

2. Description of the Prior Art

With development of the touch control technology, a mobile phone with a touch panel for performing touch control instructions has been widely implemented in people's daily life. Conventionally, a glass component required for better scratch resistance, stiffness and transparency than transparent plastics is used for covering the touch control panel, so as to prevent the touch control panel from damage due to collision, scratch and so on.

Often, there are various features, such as a hole, a slot, an opening and so on, created on the glass component either for aesthetic/decoration or functional purpose. However, due to the fragility of glass material during manufacturing and daily use, the specific natures of features, such as dimensions, locations and so on, are limited to eliminate the prospect of unreasonable failure. The above-mentioned limitations constrain implementation flexibility of the glass component and further constrain development of the mobile phone with the glass component.

SUMMARY OF THE DISCLOSURE

Thus, the present disclosure provides a cover with scratch resistance, stiffness, transparency and fine features thereon, an electronic device therewith and a method for manufacturing the same for solving above drawbacks.

According to the claimed disclosure, a cover adapted to an electronic device is disclosed. The electronic device includes a casing, and the cover includes a first covering member and a second covering member. The first covering member is made of first transparent material. The second covering member is adjacent to the first covering member. The second covering member is made of second transparent material, and at least one fine feature is formed on the second covering member.

According to the claimed disclosure, an electronic device includes a casing, a panel module installed on the casing and a cover. The cover is disposed on the panel module and adjacent to the casing. The structure of the cover is described above.

According to the claimed disclosure, a method for manufacturing a cover for a panel module of an electronic device is disclosed. The method includes providing a first covering member made of first transparent material; providing a second covering member made of second transparent material; forming at least one fine feature on the second covering member; and combining the first covering member and the second covering member.

In summary, the present disclosure utilizes the first covering member to combine with the second covering member, so as to form the cover. Since the first covering member can be made of the first transparent material, i.e. the glass material, it possesses the properties, such as scratch resistance, stiffness and transparency. In addition, since the second covering member can be made of the second transparent material, i.e. the plastic material or epoxy material, the fine feature which might result in unreasonable failure during the manufacturing or daily use as being formed on the first transparent material, i.e. the glass material, due to the fragility. As a result, the present disclosure can provide a cover with scratch resistance, stiffness, transparency and fine features thereon and further enhance implementation flexibility of the mobile phone.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
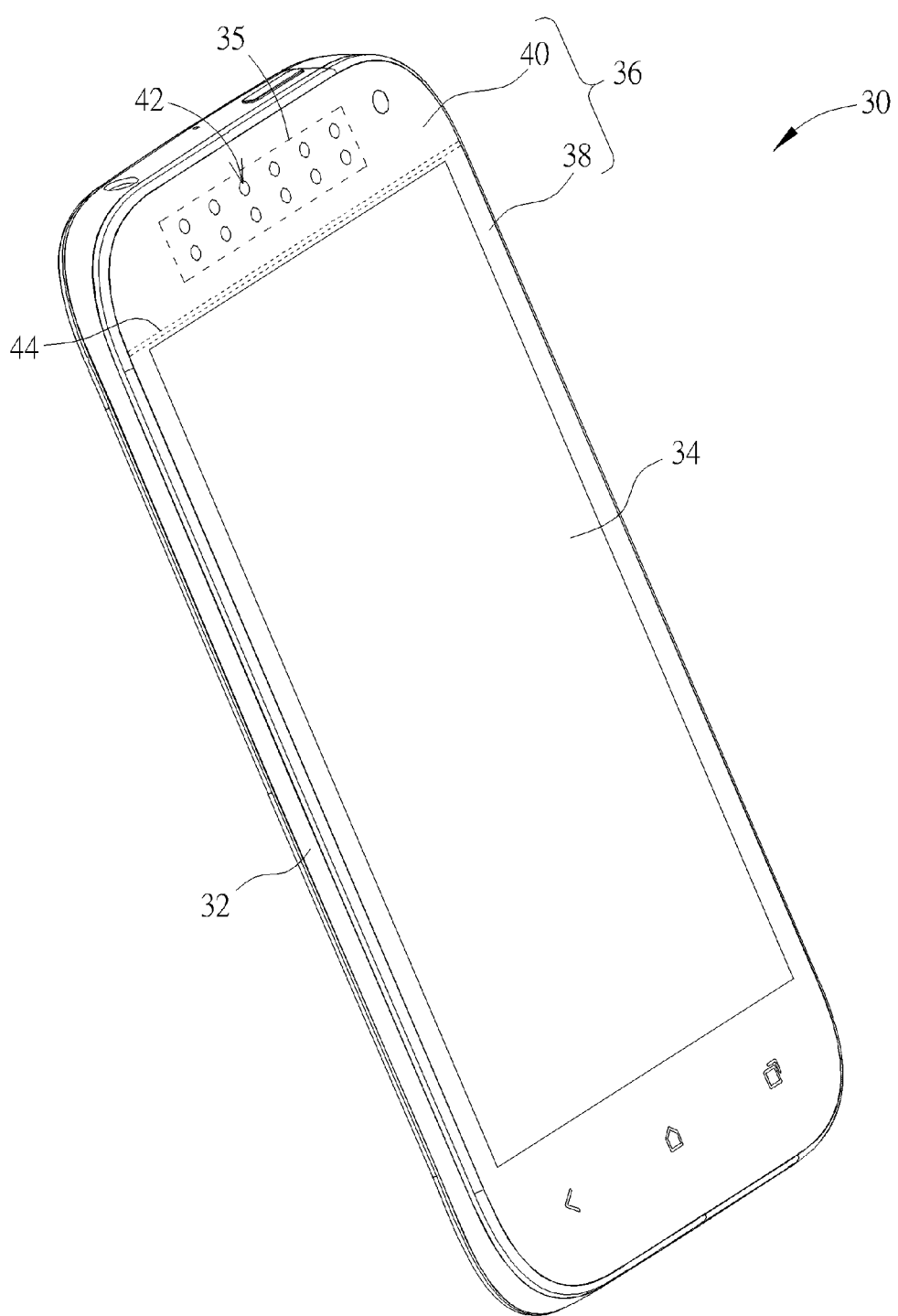
FIG. 1 is a schematic diagram of an electronic device according to a first embodiment of the present disclosure.

Please refer to FIG. 1. FIG. 1 is a schematic diagram of an electronic device 30 according to a first embodiment of the present disclosure. In this embodiment, the electronic device 30 is a mobile phone, and implementation of the electronic device 30 is not limited to those mentioned in this embodiment. For example, the electronic device 30 can be a portable electronic device, such as a tablet computer, a notebook computer and so on. As for which one of the aforesaid designs is adopted, it depends on practical demands.

As shown in FIG. 1, the electronic device 30 includes a casing 32, a panel module 34 and at least one electronic component 35. The casing 32 is used for containing inner components of the electronic device 30, so as to prevent the inner components from damages due to collision. The panel module 34 is installed within the casing 32, and the at least one electronic component 35 is disposed within the casing 32. In this embodiment, the panel module 34 is, but not limited to, a touch panel module, and the touch panel module is capable of performing a touch control instruction, such as a sliding instruction, a zooming-in/out instruction and so on. The electronic component 35 is, but not limited to, a microphone, a proximity sensor, a light sensor, a speaker and so on.

Furthermore, the electronic device 30 further includes a cover 36 including a first covering member 38. The first covering member 38 is disposed on the panel module 34 and adjacent to the casing 32. The first covering member 38 is made of first transparent material. Practically, the first transparent material is glass material, i.e. the first covering member 38 is preferably made of the glass material, which has good scratch resistance, stiffness and transparency, so as to provide the panel module 34 with not only better protection but also better light transmittance.

As shown in FIG. 1, the cover 36 further includes a second covering member 40. The second covering member 40 is combined with the first covering member 38 and adjacent to the first covering member 38. In addition, the cover 36 and the casing 32 cooperatively form a containing space for containing the inner components of the electronic device 30, such as the panel module 34, the electronic component 35 and so on. In this embodiment, the first covering member 38 can cover the panel module 34, and the second covering member 40 can cover electronic component 35. Furthermore, the second covering member 40 is made of second transparent material. Practically, the second transparent material is plastic material with the properties, such as transparency, light transmittance, index of refraction, coefficient of thermal expansion and so on, similar to glass material. For example, the plastic material can be epoxies, adhesives, thermosets, acrylic and so on. Implementation of the second transparent material is not limited to those mentioned in this embodiment, i.e. the second transparent material can be epoxy material as well. As for which one of the above-mentioned designs is adopted, it depends on practical demands.

In other words, the second covering member 40 is preferably made of the plastic or epoxy material, which has not only better machinability but also the properties similar to the glass material. Accordingly, it can not only provide the portion of the casing 32 with light transmittance similar to the glass material, but also allow fine features such as holes, slots, cosmetic/decorative elements with dimensions, which might result in failure for the glass material to be created on the second covering member 40 of the cover 36 due to the fragility during manufacturing and daily use.

Figure 2:
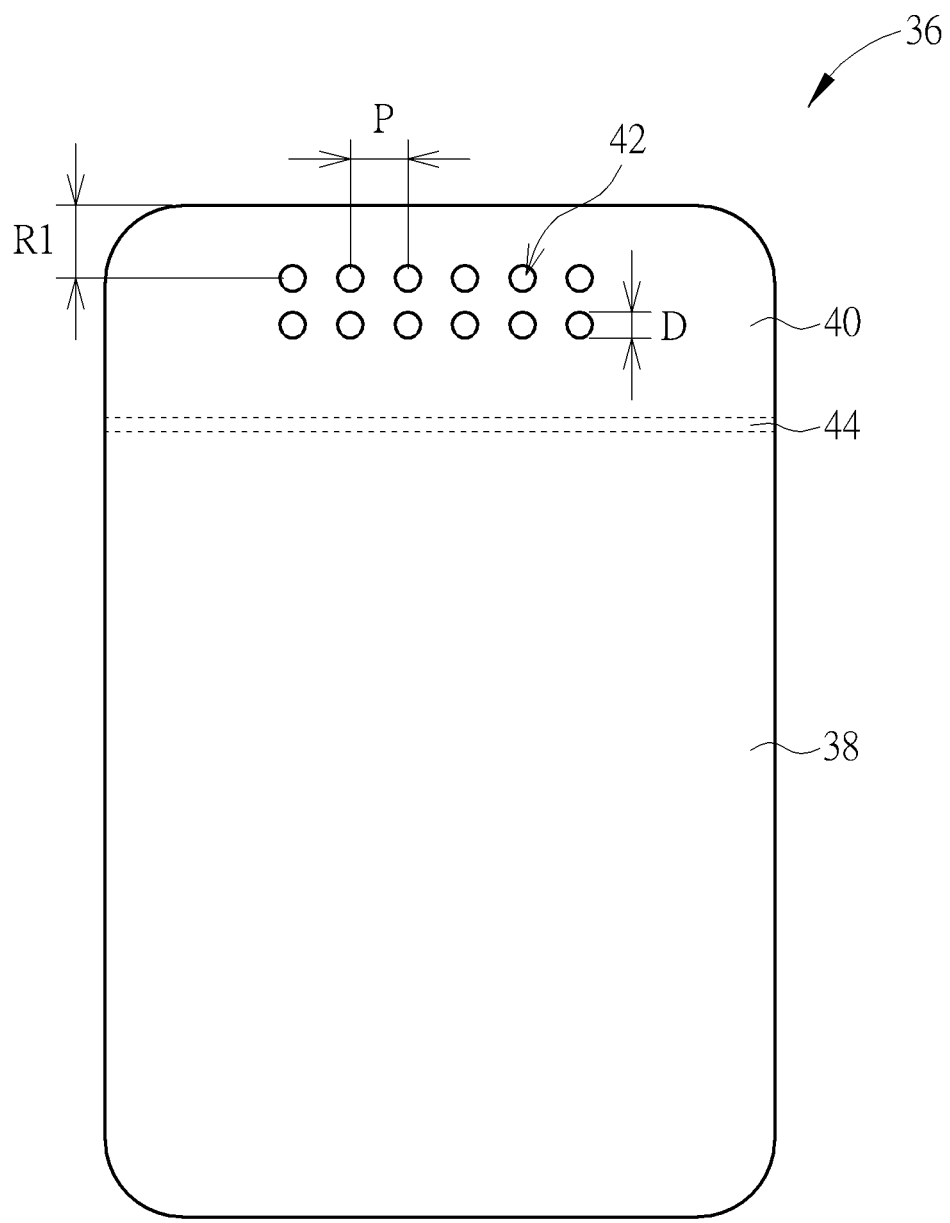
FIG. 2 is a diagram of a cover according to the first embodiment of the present disclosure.
Figure 3:
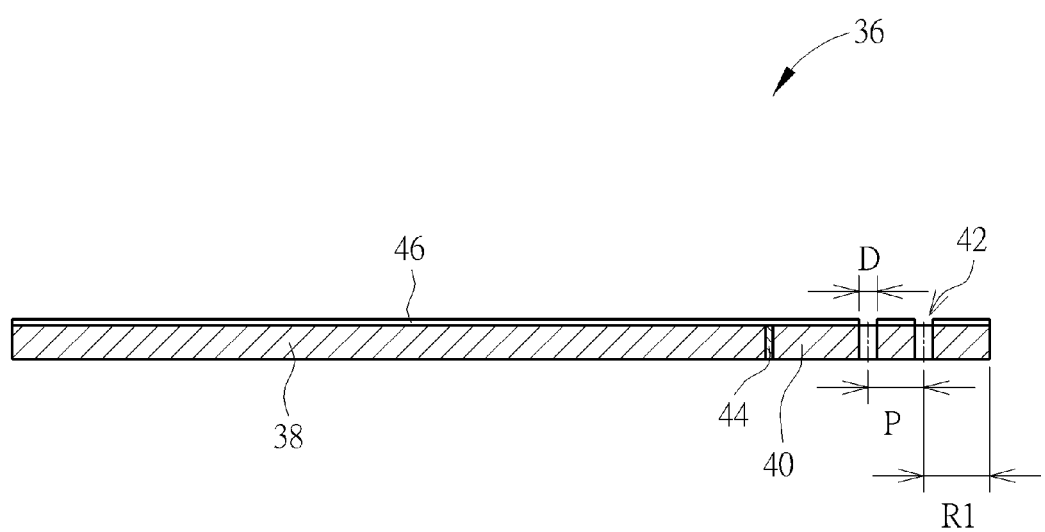
FIG. 3 is a sectional diagram of the cover according to the first embodiment of the present disclosure.

As mentioned above, at least one fine feature 42 can be formed on the second covering member 40 and located in a position corresponding to the electronic component 35. In this embodiment, the at least one fine feature 42 includes a plurality of hole structures. Please refer to FIG. 2 and FIG. 3. FIG. 2 is a diagram of the cover 36 according to the first embodiment of the present disclosure. FIG. 3 is a sectional diagram of the cover 36 according to the first embodiment of the present disclosure. As shown in FIG. 2 and FIG. 3, a diameter D of each hole structure is between 0.1 mm and 0.5 mm, a pitch distance P between the two adjacent hole structures is greater than 0.9 mm, and a distance R1 between an edge of the second covering member 40 and the hole structures is greater than 2 mm. In other words, the fine feature 42, i.e. the plurality of hole structures, with the above-mentioned dimensions can be formed on the second covering member 40 without the failure during the manufacturing and the daily use.

Furthermore, the cover 36 further includes an adhesive layer 44 for combining the first covering member 38 and the second covering member 40 in an adhesive manner. In this embodiment, the adhesive layer 44 is optically clear adhesive material. Implementation of how to combine the first covering member 38 and the second covering member 40 is not limited to those mentioned in this embodiment. For example, the first covering member 38 and the second covering member 40 can be integrally formed in an insert molding process. As for which one of the above-mentioned designs is adopted, it depends on practical demands.

As shown in FIG. 3, the cover 36 further includes a decorative layer 46 coated on the first covering member 38 and the second covering member 40. Practically, since the first covering member 38 is attached to the second covering member 40 by the adhesive layer 44, it results in discontinuity of surface in connection between the first covering member 38 and the second covering member 40. Thus, the decorative layer 46 is used for smoothing the surface of the first covering member 38, the second covering member 40 and the adhesive layer 44, so that the appearance of the cover 36 can look as if it is made of the glass material throughout. Furthermore, the gap or discontinuity of surface in a connection between the first covering member 38 and the second covering member 40 is more smooth and seamless, so that the user cannot see the discontinuity of surface in the connection therebetween from a distance of proximately 0.5 meter. And the user cannot visually distinguish the first transparent material and the second transparent material in normal use because of the similar light transmittance. When the user finger touches or slides through the surface of the cover, the user feels no gap or discontinuity of surface in connection between the first covering member 38 and the second covering member 40.

Figure 4:
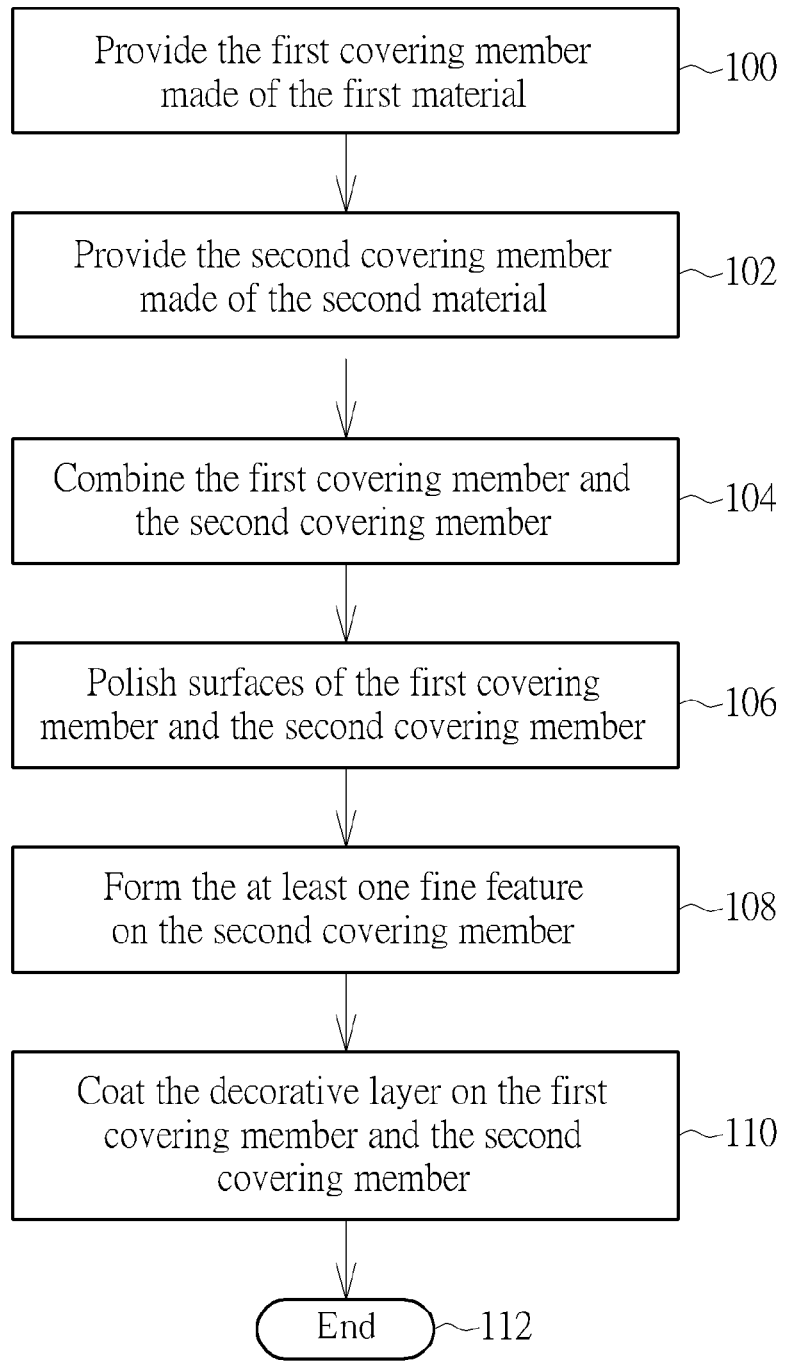
FIG. 4 is a flow chart illustrating a method for manufacturing the cover according to the first embodiment of the present disclosure.

Please refer to FIG. 4. FIG. 4 is a flow chart illustrating a method for manufacturing the cover 36 according to the first embodiment of the present disclosure. The method includes steps of:

Step 100: Provide the first covering member 38 made of the first transparent material.

Step 102: Provide the second covering member 40 made of the second transparent material.

Step 104: Combine the first covering member 38 and the second covering member 40.

Step 106: Polish surfaces of the first covering member 38 and the second covering member 40.

Step 108: Form the at least one fine feature 42 on the second covering member 40.

Step 110: Coat the decorative layer 46 on the first covering member 38 and the second covering member 40.

Step 112: End.

More detailed description for the method is provided as follows. First, the first covering member 38 made of the first transparent material and the second covering member 40 made of the second transparent material are provided, respectively (Step 100 and Step 102). Afterwards, the first covering member 38 is combined with the second covering member 40 (Step 104). In this embodiment, the adhesive layer 44 is utilized for combining the first covering member 38 and the second covering member 40 in an adhesive manner, i.e. the second covering member 40 is attached to an edge of the first covering member 38, as shown in FIG. 1 to FIG. 3.

After the first covering member 38 is combined with the second covering member 40, the surfaces of the first covering member 38 and the second covering member 40 are polished for further process (Step 106), and the at least one fine feature 42 is machined on the second covering member 40 (Step 108). It should be noticed that sequence of Step 106 and Step 108 can be switched. In other words, the at least one fine feature 42 can be machined before the surfaces of the first covering member 38 and the second covering member 40 are polished, or alternatively, the at least one fine feature 42 can be machined after the surfaces of the first covering member 38 and the second covering member 40 are polished. As for which one of the aforesaid processes is adopted, it depends on practical demands.

Furthermore, implementations of forming the at least one fine feature 42 on the second covering member 40 are not limited to machining process mentioned in this embodiment. For example, the at least one fine feature 42 can be molded on the second covering member 40 during the molding process of the second covering member 40 in advance. As a result, it can omit the machining process for saving manufacturing costs. As for which one of the aforesaid designs is adopted, it depends on practical demands. After the first covering member 38 is combined with the second covering member 40, the decorative layer 46 can be coated on the first covering member 38 and the second covering member 40 for making the appearance of the cover 36 can look as if it is made of the glass material throughout (Step 110). As a result, the cover 36 with the fine feature 42 can be manufactured (Step 112).

Figure 5:
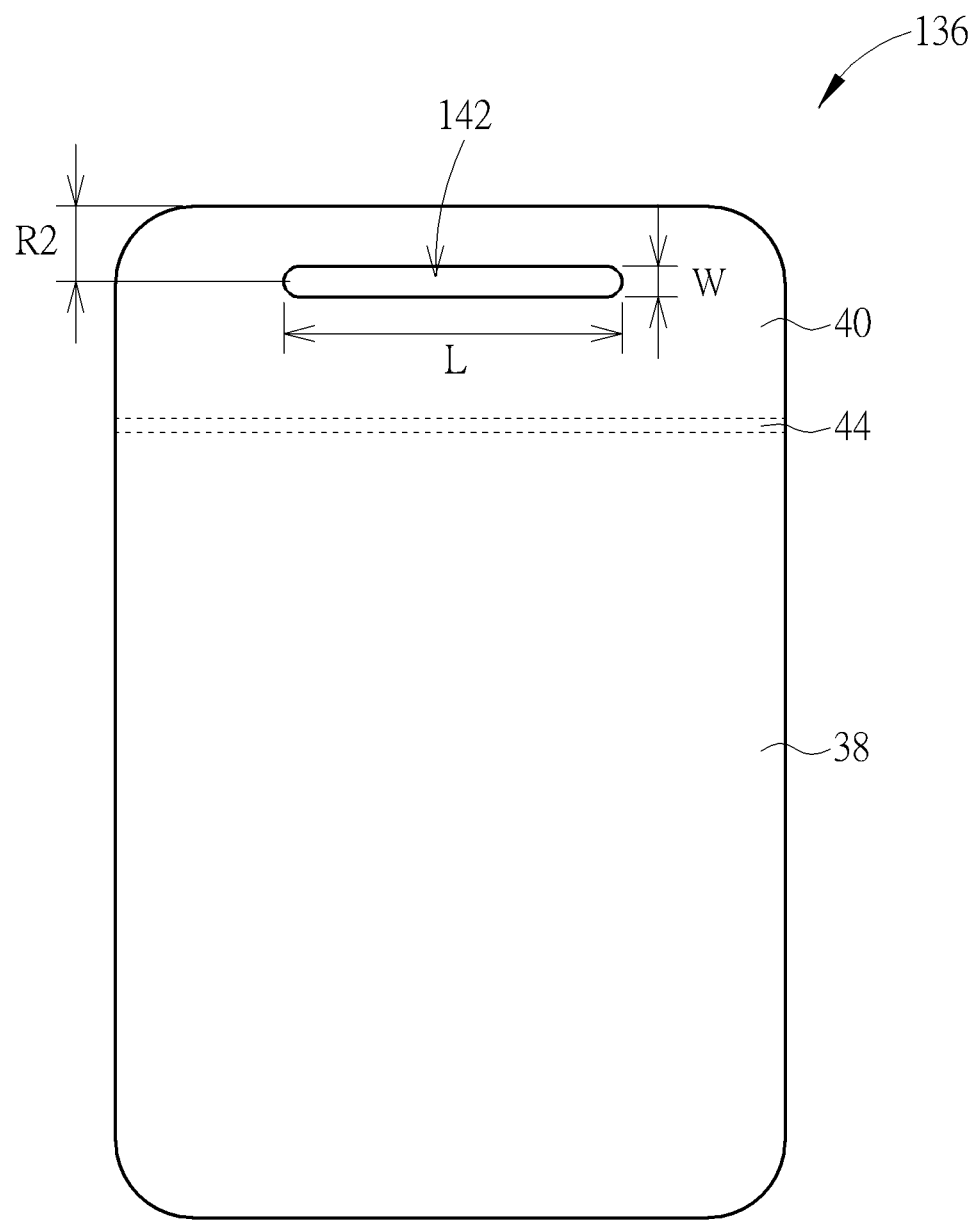
FIG. 5 is a diagram of a cover according to a second embodiment of the present disclosure.

Please refer to FIG. 5. FIG. 5 is a diagram of a cover 136 according to a second embodiment of the present disclosure. As shown in FIG. 5, the main difference between the cover 136 and the aforesaid cover 36 is that at least one fine feature 142 of the cover 136 includes a slot, wherein a length L of the slot is smaller than 20 mm, a width W of the slot is approximately between 0.5 mm and 1.0 mm, and a distance R2 between an edge of the second covering member 40 and the slot is greater than 2 mm. Components with denoted in this embodiment identical to those in the aforesaid embodiment have identical structures and functions, and further description is omitted herein for simplicity.

Figure 6:
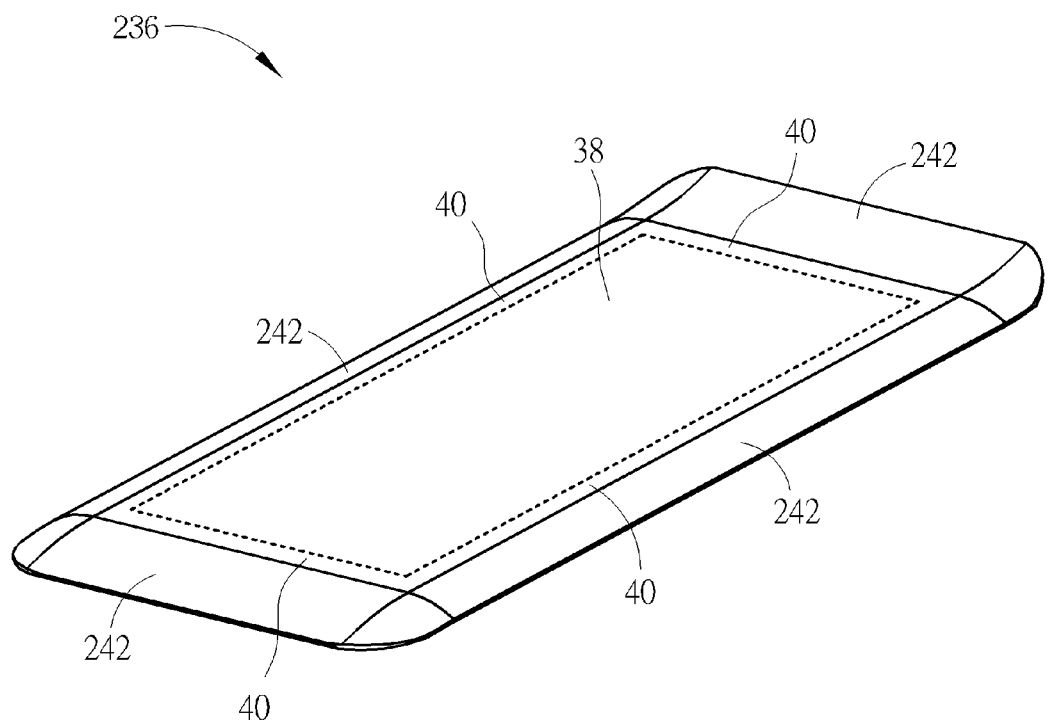
FIG. 6 is a diagram of a cover according to a third embodiment of the present disclosure.

Please refer to FIG. 6. FIG. 6 is a diagram of a cover 236 according to a third embodiment of the present disclosure. As shown in FIG. 6, the main difference between the cover 236 and the aforesaid cover 36 is that the cover 236 includes four fine features 242 wherein four second covering members 40 are connected between the four fine features 242 and four edges of the first covering member 38, respectively. In this embodiment, the four fine features 242 are respectively a curved structure. In other words, since the second covering member 40 can be made of plastic material, the fine feature 242 on the second covering member 40 can be created in a curved shape in plastic molding manner, so that the cover 236 can be made as a curved glass part. Components with denoted in this embodiment identical to those in the aforesaid embodiment have identical structures and functions, and further description is omitted herein for simplicity.

It should be noticed that structures of the fine feature are not limited to those mentioned above. For example, since the second covering member 40 can be made of plastic material, the fine feature can protrude from the second covering member 40 in a plastic molding manner, i.e. the fine feature can be a protruding structure, such as a hook, a decorating strip and so on. As for which one of the above-mentioned designs is adopted, it depends on practical demands.

Figure 7:
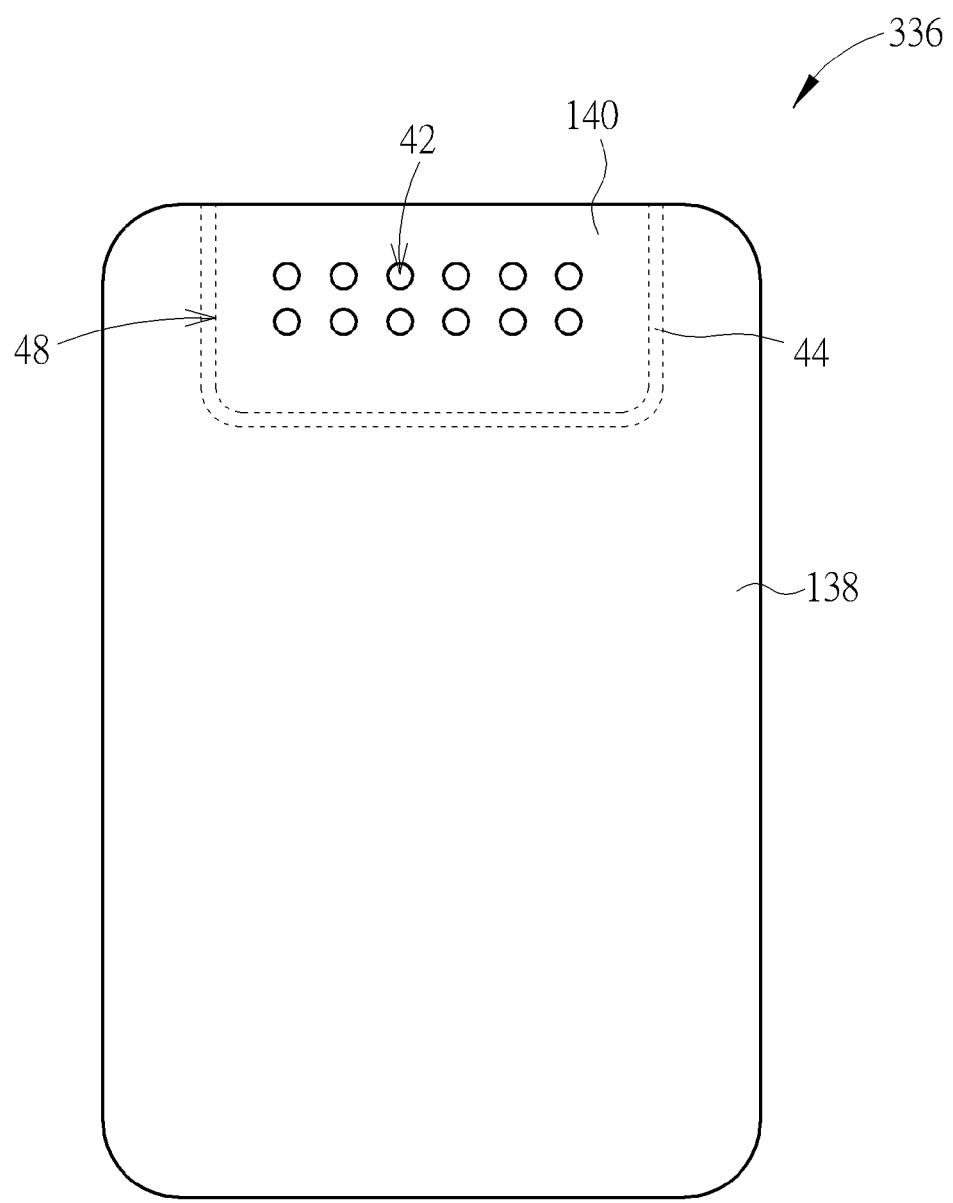
FIG. 7 is a diagram of a cover according to a fourth embodiment of the present disclosure.

Please refer to FIG. 7. FIG. 7 is a diagram of a cover 336 according to a fourth embodiment of the present disclosure. As shown in FIG. 7, the main difference between the cover 336 and the aforesaid cover 36 is that a containing portion 48 is formed on a first covering member 138. In this embodiment, the containing portion 48 is a breach. The breach, i.e. the containing portion 48, is used for containing a second covering member 140. When the second covering member 140 is desired to be contained in the containing portion 48, i.e. the breach, the adhesive layer 44 is used for attaching the second covering member 140 inside the containing portion 48, i.e. the breach, so as to combine the second covering member 140 and the first covering member 138.

It should be noticed that, in this embodiment, the fine features 42 on the first covering member 138 are a plurality of hole structures, and the structural design of the fine feature 42 is not limited to those mentioned in this embodiment. For example, the fine feature 42 can be a slot as well. As for which one of the above-mentioned designs is adopted, it depends on practical demands. Components with denoted in this embodiment identical to those in the aforesaid embodiment have identical structures and functions, and further description is omitted herein for simplicity.

Figure 8:
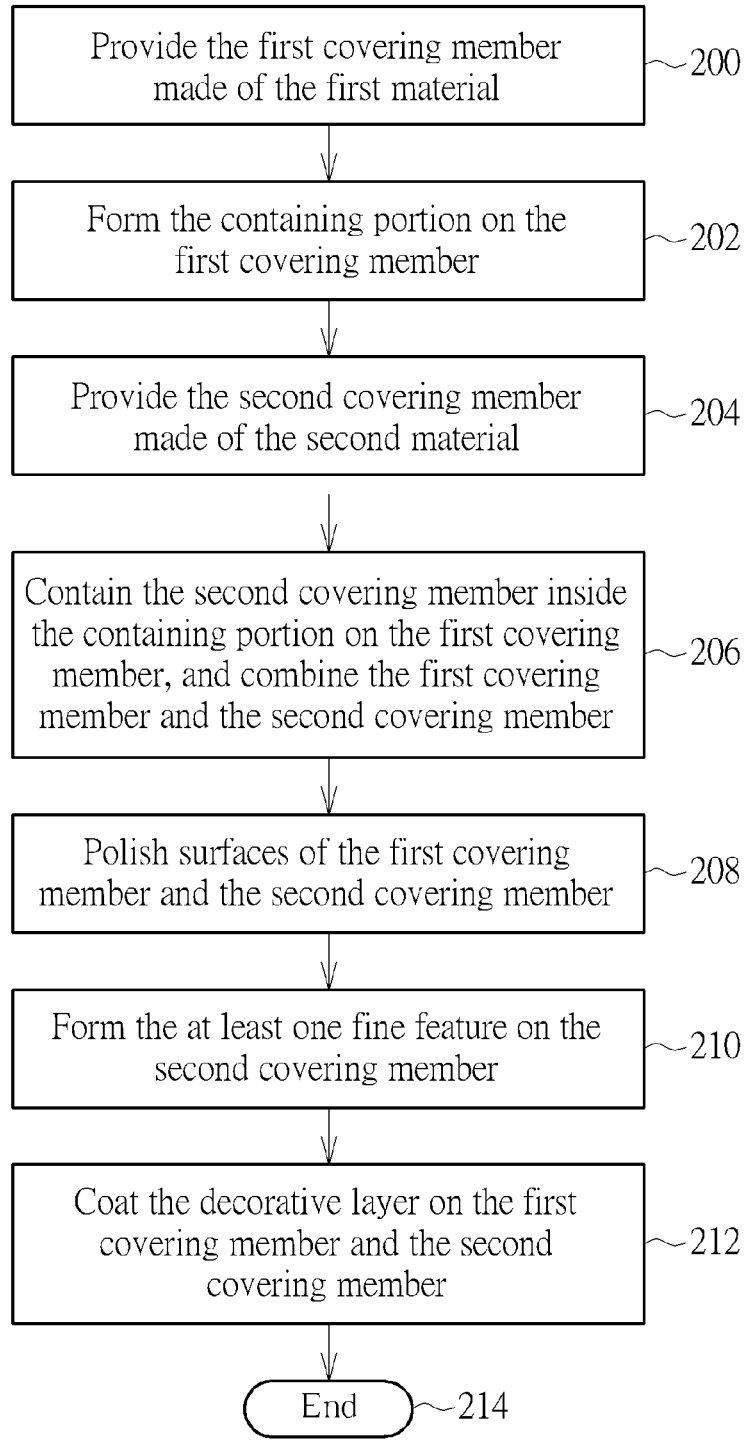
FIG. 8 is a flow chart illustrating a method for manufacturing the cover according to the fifth embodiment of the present disclosure.

Please refer to FIG. 8. FIG. 8 is a flow chart illustrating a method for manufacturing the cover 336 according to the fifth embodiment of the present disclosure. The method includes steps of:

Step 200: Provide the first covering member 138 made of the first transparent material.

Step 202: Form the containing portion 48 on the first covering member 138.

Step 204: Provide the second covering member 140 made of the second transparent material.

Step 206: Contain the second covering member 140 inside the containing portion 48 on the first covering member 138, and combine the first covering member 138 and the second covering member 140.

Step 208: Polish surfaces of the first covering member 138 and the second covering member 140.

Step 210: Form the at least one fine feature 42 on the second covering member 140.

Step 212: Coat the decorative layer 46 on the first covering member 138 and the second covering member 140.

Step 214: End.

As shown in FIG. 8 and FIG. 4, the main difference between the method for manufacturing the cover 36 shown in FIG. 4 and the method for manufacturing the cover 336 is that the containing portion 48 needs to be formed on the first covering member 138 for containing the second covering member 140 (Step 202 and Step 206). Steps other than Step 202 and Step 206 in FIG. 8 are similar to those mentioned in FIG. 4, so the further descriptions are omitted herein for simplicity.

Figure 9:
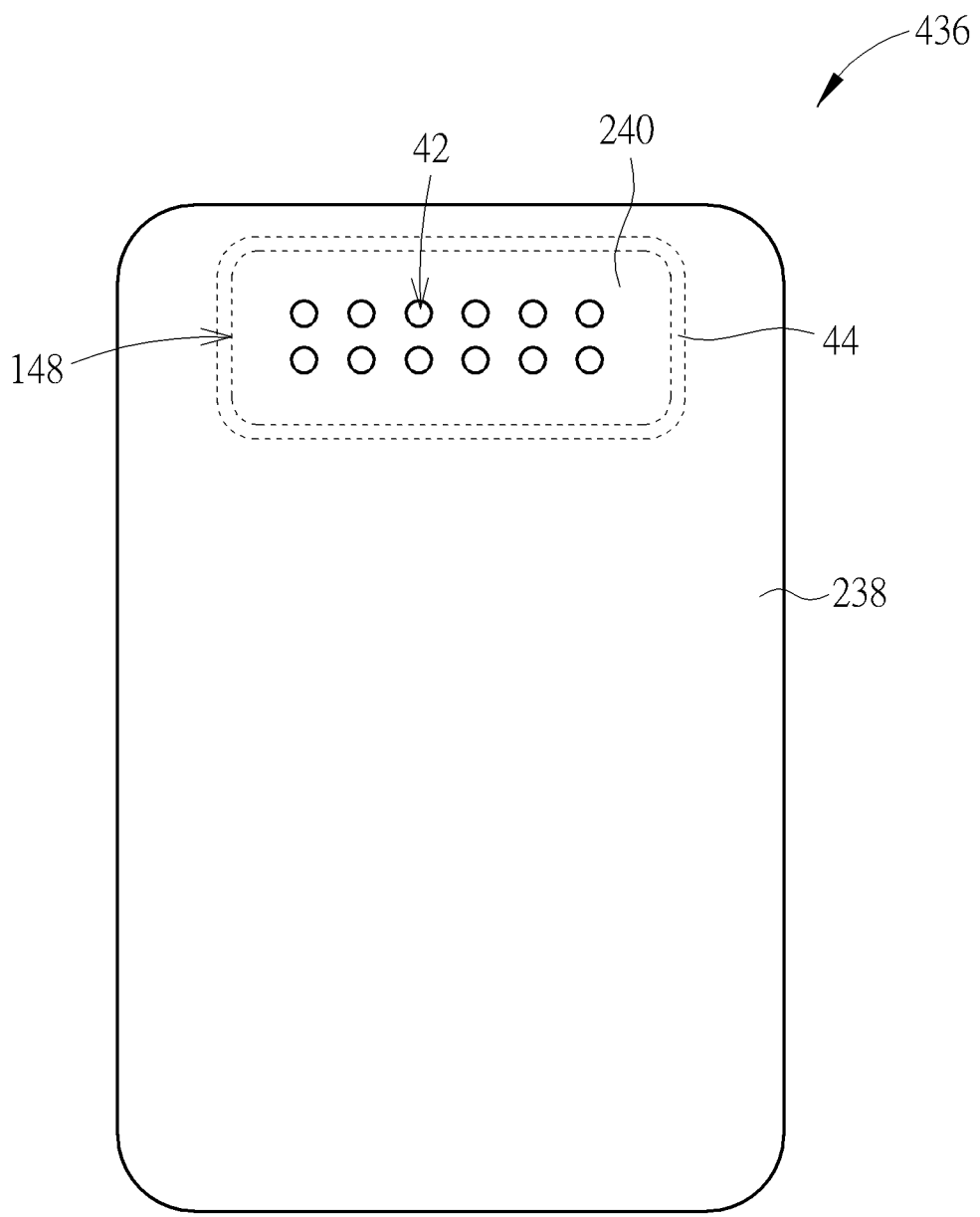
FIG. 9 is a diagram of a cover according to a fifth embodiment of the present disclosure.

Please refer to FIG. 9. FIG. 9 is a diagram of a cover 436 according to a fifth embodiment of the present disclosure. As shown in FIG. 9, the main difference between the cover 436 and the aforesaid cover 336 is that a containing portion 148 formed on a first covering member 238 of the cover 436 is an opening. The opening, i.e. the containing portion 148, is used for containing a second covering member 240. When the second covering member 240 is desired to be contained in the containing portion 148, i.e. the opening, the adhesive layer 44 is used for attaching the second covering member 240 inside the containing portion 148, i.e. the opening, so as to combine the second covering member 240 and the first covering member 238.

It should be noticed that, in this embodiment, the fine features 42 on the first covering member 238 are a plurality of hole structures, and the structural design of the fine feature 42 is not limited to those mentioned in this embodiment. For example, the fine feature 42 can be a slot as well. As for which one of the above-mentioned designs is adopted, it depends on practical demands. Components with denoted in this embodiment identical to those in the aforesaid embodiment have identical structures and functions, and further description is omitted herein for simplicity. It should be noticed that a method for manufacturing the cover 436 is similar to the method illustrated in FIG. 8, so further description is omitted herein for simplicity.

Compared to the prior art, the present disclosure utilizes the first covering member to combine with the second covering member, so as to form the cover. Since the first covering member can be made of the first transparent material, i.e. the glass material, it possesses the properties, such as scratch resistance, stiffness and transparency. In addition, since the second covering member can be made of the second transparent material, i.e. the plastic material or epoxy material, the fine feature which might result in failure during the manufacturing or daily use as being formed on the first transparent material, i.e. the glass material, due to the fragility. As a result, the present disclosure can provide a cover with scratch resistance, stiffness, transparency and fine features thereon and further enhance implementation flexibility of the mobile phone.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A cover assembly adapted to an electronic device with a panel module and an electronic component separate from the panel module, the cover assembly comprising:
   a casing; and
   a cover disposed on the casing, the cover and the casing being assembled with each other in a direction perpendicular to the panel module and cooperatively forming a containing space for containing the panel module and the electronic component, the cover comprising:
      a first covering member corresponding to and covering the panel module, the first covering member being adjacent to the casing and made of first transparent material, the first covering member having a first planar surface; and
      a second covering member adjacent to the first covering member and the casing, the second covering member corresponding to and covering the electronic device, the second covering member being made of second transparent material different from the first transparent material, the second covering member being combined with the first covering member to be a one-piece structure, the second covering member being separable from the casing, and at least one fine feature being formed on the second covering member, a distance between the at least one fine feature and an edge of the second covering member being greater than 2 mm, the first covering member and the second covering member having same thicknesses, the second covering member having a second planar surface, and the first planar surface and the second planar surface being flat surfaces and coplanar with each other;
   wherein the at least one fine feature comprises a plurality of hole structures, a diameter of each hole structure is between 0.1 mm and 0.5 mm, a pitch distance between the two adjacent hole structures is greater than 0.9 mm, and surfaces of the first covering member and the second covering member are polished after the first covering member is combined with the second covering member.

2. The cover assembly of claim 1, wherein the second covering member is attached to an edge of the first covering member.

3. The cover assembly of claim 1, wherein the first transparent material is glass material and the second transparent material is plastic material.

4. The cover assembly of claim 2, wherein the surface on the edge between the first covering member and the second covering member is substantially smooth and seamless.

5. The cover assembly of claim 1, wherein a containing portion is formed on the first covering member and for containing the second covering member.

6. The cover assembly of claim 5, wherein the containing portion is a breach or an opening.

7. The cover assembly of claim 1, further comprising:
   an adhesive layer for combining the first covering member and the second covering member in an adhesive manner.

8. The cover assembly of claim 1, wherein the first transparent material is glass material, and the second transparent material is plastic or epoxy material.

9. The cover assembly of claim 1, further comprising:
   a decorative layer coated on the first covering member and the second covering member.

10. An electronic device, comprising:
    a panel module;
    an electronic component separate from the panel module; and
    a cover assembly of claim 1.

11. The electronic device of claim 10, wherein the at least one fine feature is located in a position corresponding to the electronic component.

* * * * *